(12) United States Patent
Brunner et al.

(10) Patent No.: US 8,908,083 B2
(45) Date of Patent: Dec. 9, 2014

(54) DYNAMIC AUTOFOCUS OPERATIONS

(75) Inventors: Ralph Brunner, Cupertino, CA (US); Ting Chen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 112 days.

(21) Appl. No.: 13/247,791

(22) Filed: Sep. 28, 2011

(65) Prior Publication Data

US 2013/0076967 A1   Mar. 28, 2013

(51) Int. Cl.
*G03B 13/00* (2006.01)
*H04N 5/232* (2006.01)
*H04N 1/21* (2006.01)
*H04N 101/00* (2006.01)

(52) U.S. Cl.
CPC ......... *H04N 1/2112* (2013.01); *H04N 5/23212* (2013.01); *H04N 2201/0084* (2013.01); *H04N 2101/00* (2013.01); *H04N 2201/0096* (2013.01)
USPC ........................................................ 348/345

(58) Field of Classification Search
USPC .................. 348/345, 348, 350, 361, 357; 396/79–83, 89–152; 382/255; 359/696, 359/698
See application file for complete search history.

(56) References Cited

U.S. PATENT DOCUMENTS

| | | | |
|---|---|---|---|
| 2004/0051029 A1 | 3/2004 | Hirai | |
| 2006/0066744 A1* | 3/2006 | Stavely et al. | 348/352 |
| 2006/0192886 A1* | 8/2006 | Kobayashi | 348/345 |
| 2008/0031609 A1* | 2/2008 | Rukes | 396/89 |
| 2008/0037974 A1 | 2/2008 | Seok | |
| 2010/0066864 A1 | 3/2010 | Takashi | |

FOREIGN PATENT DOCUMENTS

| | | |
|---|---|---|
| JP | 2001-255451 | 9/2001 |
| JP | 2004-289214 | 10/2004 |
| JP | 2006317593 A | 11/2006 |
| JP | 2011081186 A | 4/2011 |
| WO | 2009107420 A1 | 9/2009 |
| WO | 2010/149763 | 12/2010 |
| WO | 2011/004686 | 1/2011 |

OTHER PUBLICATIONS

International Search Report and Written Opinion for PCT Application No. PCT/US2012/055109, Dated Jan. 17, 2013, 17 pages.
Extended European Search Report for EP Application No. 12186063.9, Dated Jan. 17, 2013, 10 pages.
Australian Search Report for AU Application No. 2012216858, Dated Feb. 19, 2013, 4 pages.

* cited by examiner

*Primary Examiner* — Mekonnen Dagnew
(74) *Attorney, Agent, or Firm* — Wong, Cabello, Lutsch, Rutherford & Brucculeri, LLP

(57) ABSTRACT

Systems, methods, and computer readable media for dynamically adjusting an image capture device's autofocus (AF) operation based, at least in part, on the device's orientation are described. In general, information about an image capture device's orientation may be used to either increase the speed or improve the resolution of autofocus operations. More particularly, orientation information such as that available from an accelerometer may be used to reduce the number of lens positions (points-of-interest) used during an autofocus operation, thereby improving the operation's speed. Alternatively, orientation information may be used to reduce the lens' range of motion while maintaining the number of points-of-interest, thereby improving the operation's resolution.

28 Claims, 7 Drawing Sheets

IMAGE 1

IMAGE 2

REGIONS COMPARED

DYNAMIC AUTOFOCUS OPERATIONS

BACKGROUND

This disclosure relates generally to the field of digital image capture and processing. More particularly, this disclosure relates to techniques for improved autofocus operations in a digital image capture device. A camera's autofocus (AF) system automatically adjusts the camera lens to obtain focus on a subject. In general, AF systems use contrast sensors within the camera (passive AF) or by emitting a signal to illuminate or estimate the distance to a subject (active AF). Passive AF may employ either contrast detection or phase detection methods, but both rely on contrast for achieving autofocus.

Some digital cameras utilize autofocus sensors that are different from the camera's image sensor. This may, for example, occur in single-function digital cameras. In small multifunction devices such as mobile phones, tablet computers, personal digital assistants and portable music/video players, however, separate image and autofocus sensors are often not used. In devices such as these, autofocus operations can involve adjusting the position of the device's lens (or lens assembly) at a specified number of locations; evaluating the focus (e.g., contrast) between corresponding points in successive images (maximum contrast is assumed to correspond to maximum sharpness or "best" focus).

Multifunction devices typically evaluate contrast/focus at a fixed number of points in an image and, when the lens is moved to obtain successive images, a fixed number of lens positions. As such, these devices can provide autofocus operations at a fixed rate and with a fixed resolution. Thus, it would be beneficial to provide a mechanism to dynamically improve the speed or resolution of a digital image capture device.

SUMMARY

In one embodiment a method to perform an autofocus operation for a digital image capture device using knowledge of the device's orientation is described. A method in accordance with one embodiment includes determining the orientation of the device based at least in part on the signal from an orientation sensor. One illustrative orientation sensor is an accelerometer. Based at least in part on the device's orientation, a range of motion may be determined for the autofocus operation. This range of motion refers to the distance through which a lens, or lens assembly, is moved during the autofocus operation. The device's orientation often causes this range to be less than the device's autofocus full range of motion (i.e., the maximum distance through which the lens may be moved during autofocus operations). If the autofocus mode is set to FAST, the autofocus operation may be performed based on the autofocus range of motion and less than the device's full number of autofocus points-of-interest. If the autofocus mode is set to HIGH-RESOLUTION, the autofocus operation may be performed based on the autofocus range of motion and the device's full number of autofocus points-of-interest.

In another embodiment, the method may be embodied in computer executable program code and stored in a non-transitory storage device. In yet another embodiment, the method may be implemented in an electronic device having digital image capture capabilities.

DETAILED DESCRIPTION

Figure 1:
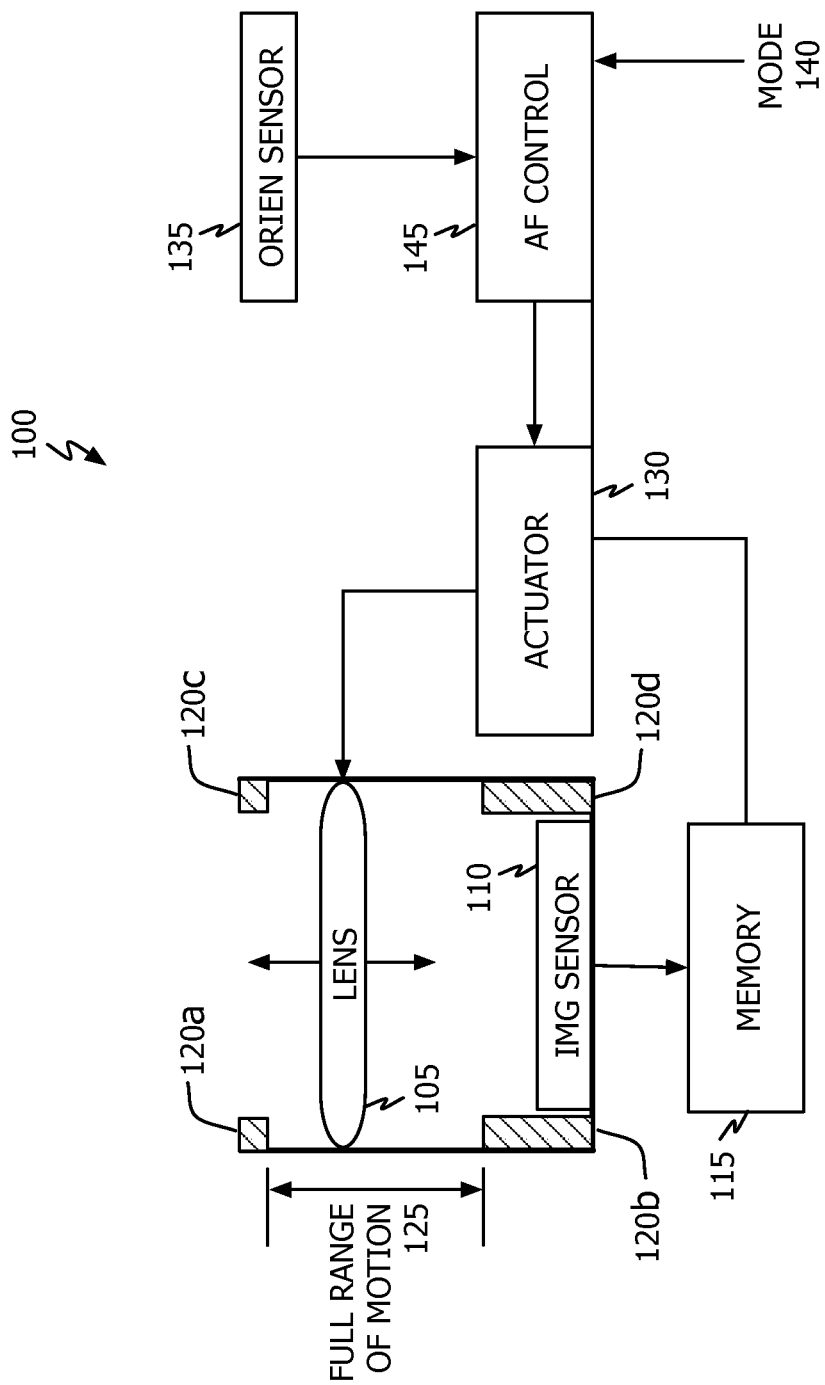
FIG. 1 shows, in block diagram form, a simplified block diagram of an autofocus system in accordance with one embodiment.

This disclosure pertains to systems, methods, and computer readable media for dynamically adjusting an image capture device's autofocus (AF) operation based, at least in part, on the device's orientation. In general, techniques are disclosed for using orientation information about an image capture device to either increase the speed or improve the resolution of AF operations. More particularly, orientation information such as that available from an accelerometer may be used to reduce the number of lens positions (points-of-interest, POI) used during an AF operation, thereby improving the operation's speed. Alternatively, orientation information may be used to reduce the lens' range of motion while maintaining the number of POI, thereby improving the operation's resolution.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In this context, it should be understood that references to numbered drawing elements without associated identifiers (e.g., 100) refer to all instances of the drawing element with identifiers (e.g., 100a and 100b). Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of image capture devices having the benefit of this disclosure.

Various embodiments will now be described in the context of an image capture device incorporated within a multifunction unit such as a mobile phone or tablet computer. During AF operations, such devices adjust the position of their lens (or lens assembly) and include an orientation sensor such as an accelerometer. As used herein, each location at which the lens is positioned for purposes of determining the relative contrast between corresponding points (or regions) in successive images, is referred to as a point-of-interest (POI).

Referring to FIG. 1, a simplified block diagram of AF system 100 in accordance with one embodiment includes lens 105, image sensor 110, memory 115 and mechanical stops 120 (120a, 120b, 120c and 120d) which define full range of motion 125. Also included are actuator 130 for displacing lens 105 between mechanical stops 120, orientation sensor 135 and mode select input 140, both of which supply input to AF control unit 145. In one embodiment, an image capture device may use a charged coupled device (or a complementary metal-oxide semiconductor), an electro-mechanical unit (e.g., a voice coil motor) as actuator 130 and an accelerometer as orientation sensor 135. It will be understood that accelerometers measure acceleration in the direction of the sensor's plane.

Figure 2:
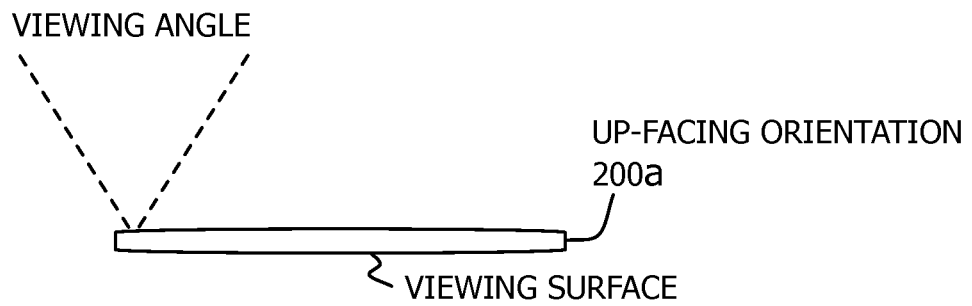
FIG. 2 shows three orientations for an image capture device at which orientation information may be obtained.
Figure 2:
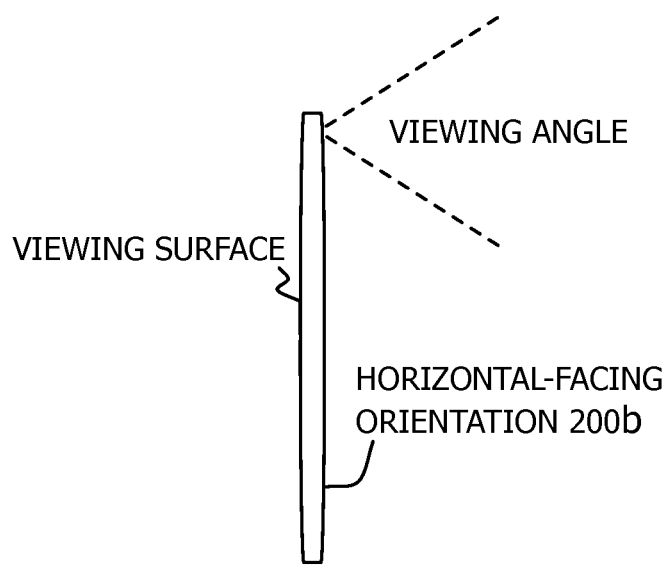
Figure 2:
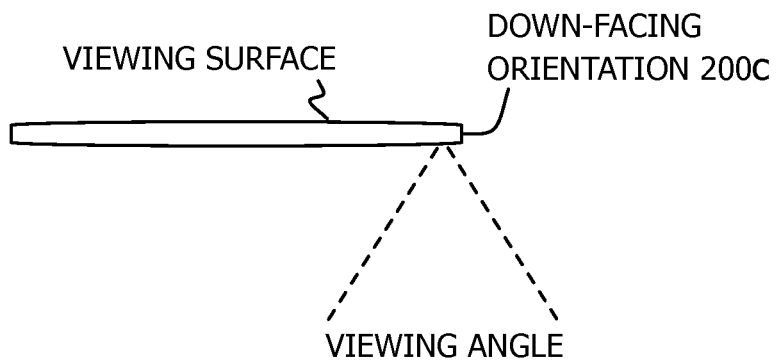

Referring to FIG. 2, AF system 100 may be configured such that when image capture device is in an up-facing orientation (e.g., 200a) accelerometer output corresponds to +1 g, when in a horizontal-facing orientation (e.g., 200b) accelerometer output corresponds to 0 g and when in a down-facing orientation (e.g., 200c) accelerometer output corresponds to −1 g. (Also shown for completeness, and not limitation, is the illustrative device's viewing surface and image sensor's viewing angle.) It will be further understood that voice motor coil actuator 130 may be driven by a digital signal. Thus, the motion of lens 105 may be designated by a voice motor coil input signal between specified minimum and maximum values.

Figure 3:
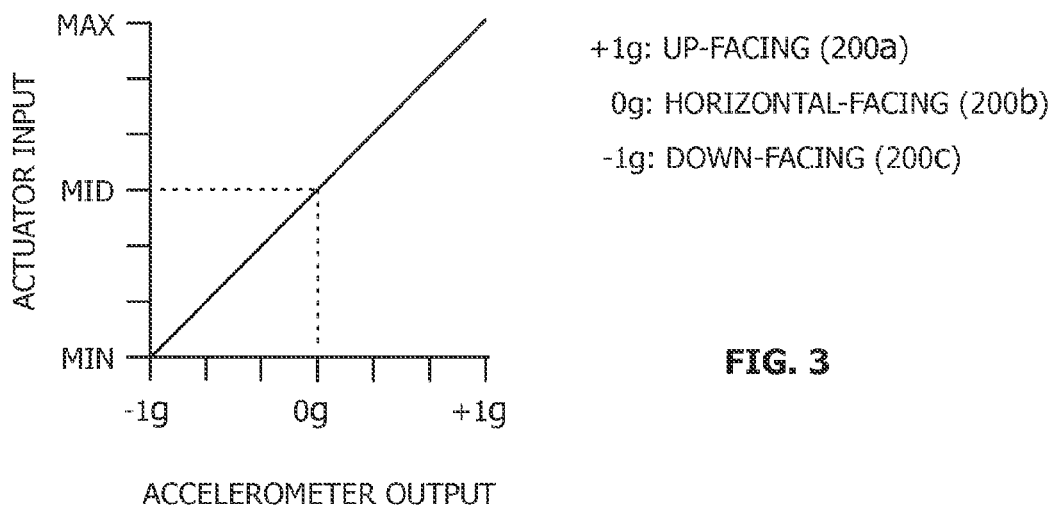
FIG. 3 shows the relationship between orientation sensor output and actuator input required to focus the image capture device at infinity in accordance with one embodiment.

Referring to FIG. 3, one relationship between accelerometer output and actuator input (e.g., voice motor coil input) to focus the image capture device at infinity is shown. By juxtaposing FIGS. 2 and 3, it can be seen that when the image capture device is in an up-facing orientation (200a), voice motor coil actuator 130 must be driven with the maximum input signal (MAX) to place the lens such that focus is achieved at infinity. Similarly, when the image capture device is in a horizontal-facing orientation (200b), voice motor coil actuator 130 must be driven with an input signal midway between the maximum and minimum values (MID) to place the lens such that focus is achieved at infinity. Finally, when the image capture device is in a down-facing orientation (200c), voice motor coil actuator 130 must be driven with the minimum input signal (MIN) to place the lens such that focus is achieved at infinity. (The above discussion is based on calibrating the image capture device such that it is focused at infinity when in the down-facing position. One of ordinary skill in the art will understand, in light of this disclosure, other positions may be used to calibrate the device.)

In prior art image capture devices, every AF operation moves (or attempts to move) the device's lens through a specified number of locations; beginning at the minimum (or maximum) actuator input and progressing through to the maximum (or minimum) actuator input. In accordance with this disclosure, however, orientation sensor 135 may be used to determine an image capture device's orientation and, based on this, provide a faster AF operation or a higher resolution AF operation.

Figure 4:
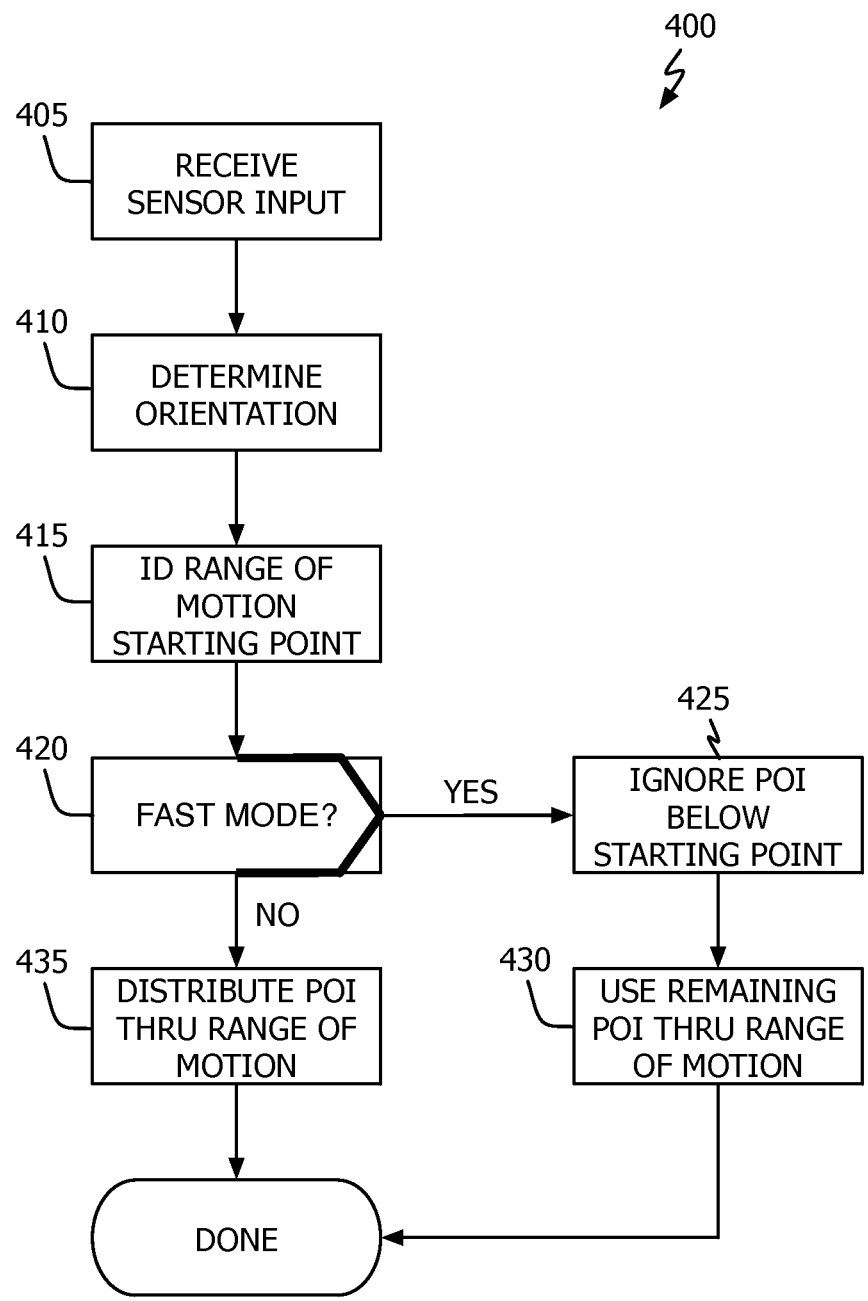
FIG. 4 shows, in flowchart form, an autofocus operation in accordance with one embodiment.

Referring to FIG. 4, AF operation 400 in accordance with one embodiment begins when orientation sensor input is received at AF control unit 145 (block 405). From that input, the image capture device's orientation may be determined as described above (block 410). Using a knowledge of the relationship between the orientation sensor's output and the actuator's output needed to focus the image capture device at infinity (e.g., as shown in FIG. 3), a starting point for AF operation 400 may be determined (block 415).

Figure 5:
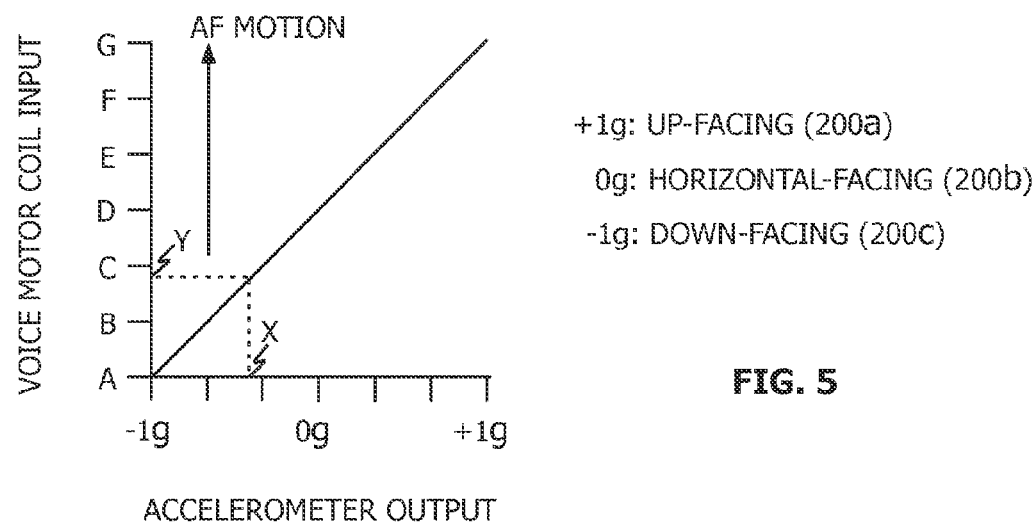
FIG. 5 shows the relationship between orientation sensor output and actuator input required to focus the image capture device at infinity in accordance with another embodiment.

Referring to FIG. 5, for the purpose of this example assume orientation sensor 135 (e.g., an accelerometer) provides AF control unit 145 with input representative of accelerations between −1 g (down-facing) and +1 g (up-facing) as illustrated in FIG. 2; that AF control unit 145 drives actuator 130 (e.g., a voice motor coil) with a signal having a minimum value 'A' and a maximum value 'G;' that AF operation 400 moves lens 105 from a focus point at infinity to the image capture device's closest focus point; and that when the lens' full range of motion 125 is used during AP operation 400, seven POI are used (identified by actuator inputs A, B, C, D, E, F, and G). Thus, if accelerometer output is represented by a value 'X,' the corresponding voice motor coil input needed to focus the image capture device at infinity is given by a value 'Y.' Accordingly, the voice motor coil input 'Y' corresponds to the AF range of motion's starting point and the device's AF range of motion may be given by the range of actuator input voltages: Y to G.

Referring again to FIG. 4, mode input 140 (see FIG. 1) may then be used to determine whether the image capture device should operate in the FAST mode or the HIGH-RESOLUTION or FINE mode. If mode input 140 indicates the FAST mode (the "YES" prong of block 420), all specified POI below the lens position corresponding to value 'Y' would be ignored during the remainder of AF operation 400 (block 425). This results in AF operation 400 evaluating images for contrast at lens locations corresponding to actuator inputs of C, D, E, F and G (block 430). Thus, in FAST mode AF operation 400 evaluates images at only 5 locations rather than the specified 7 locations. It has been found this can provide a significant speed-up in AF operations. (It will be understood that the number of locations actually evaluated depends upon the measured orientation.) This is particularly true when lens 105 does not need to be adjusted to the location associated with minimum actuator input. This is because the presence of mechanical stops 120 require that lens assembly 105 be moved more slowly at and near the location corresponding to actuator input A to avoid mechanical ringing or damage. If, on the other hand, mode input 140 indicates the FAST mode should not be used (the "NO" prong of block 420), the specified number of locations (7) may be redistributed over the remaining range of motion: C through G (block 435). In practice, the number of lens positions at which to evaluate images may be fewer or more than seven (7). In addition, the positions may be distributed over the range of motion in any desired manner: uniformly as illustrated in FIG. 5 or otherwise as may be beneficial for a particular image capture device's characteristics. The effect of acts in accordance with block 435 is to provide more AF locations over a smaller range of motion than would normally be used over that range. This, in turn, results in an increased AF operation resolution.

Figure 6:
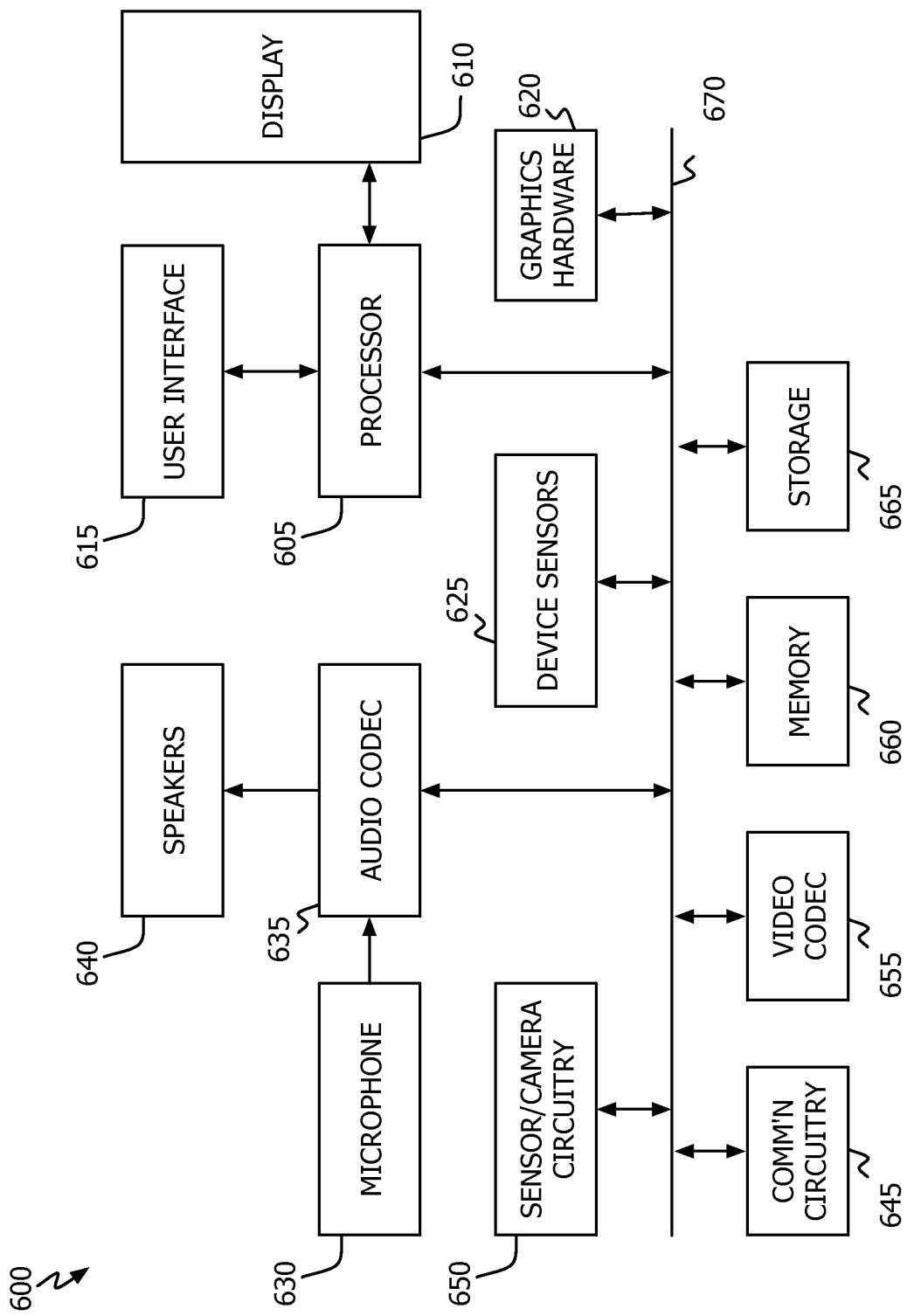
FIG. 6 shows, in block diagram form, a simplified multifunction device according to one embodiment.

Referring now to FIG. 6, a simplified functional block diagram of illustrative multifunction device 600 is shown according to one embodiment. Multifunction electronic device 600 may include processor 605, display 610, user interface 615, graphics hardware 620, device sensors 625 (e.g., proximity sensor/ambient light sensor, accelerometer and/or gyroscope), microphone 630, audio codec(s) 635, speaker(s) 640, communications circuitry 645, digital image capture unit 650 (e.g., including autofocus unit 100) video codec(s) 655, memory 660, storage device 665, and communications bus 670. Multifunction electronic device 600 may be, for example, a digital camera or a personal electronic device such as a personal digital assistant (PDA), personal music player, mobile telephone, or a tablet computer.

Processor 605 may execute instructions necessary to carry out or control the operation of many functions performed by device 600 (e.g., such as the generation and/or processing of images). Processor 605 may, for instance, drive display 610 and receive user input from user interface 615. User interface 615 may allow a user to interact with device 600. For example, user interface 615 can take a variety of forms, such as a button, keypad, dial, a click wheel, keyboard, display screen and/or a touch screen. Processor 605 may also, for example, be a system-on-chip such as those found in mobile devices and include a dedicated graphics processing unit (GPU). Processor 605 may be based on reduced instruction-set computer (RISC) or complex instruction-set computer (CISC) architectures or any other suitable architecture and may include one or more processing cores. Graphics hardware 620 may be special purpose computational hardware for processing graphics and/or assisting processor 605 to process graphics information. In one embodiment, graphics hardware 620 may include a programmable graphics processing unit (GPU).

Sensor and camera circuitry 650 may capture still and video images that may be processed, at least in part, by video codec(s) 655 and/or processor 605 and/or graphics hardware 620, and/or a dedicated image processing unit incorporated within circuitry 650. Images so captured may be stored in memory 660 and/or storage 665. Memory 660 may include one or more different types of media used by processor 605 and graphics hardware 620 to perform device functions. For example, memory 660 may include memory cache, read-only memory (ROM), and/or random access memory (RAM). Storage 665 may store media (e.g., audio, image and video files), computer program instructions or software, preference information, device profile information, and any other suitable data. Storage 665 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 660 and storage 665 may be used to tangibly retain computer program instructions or code organized into one or more modules and written in any desired computer programming language. When executed by, for example, processor 605 such computer program code may implement one or more of the methods described herein.

Figure 7:
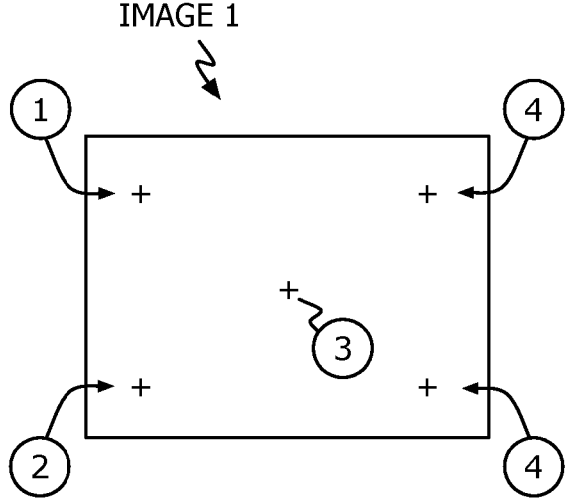
FIG. 7 illustrates the idea of corresponding points in successive images in accordance with one embodiment.
Figure 7:
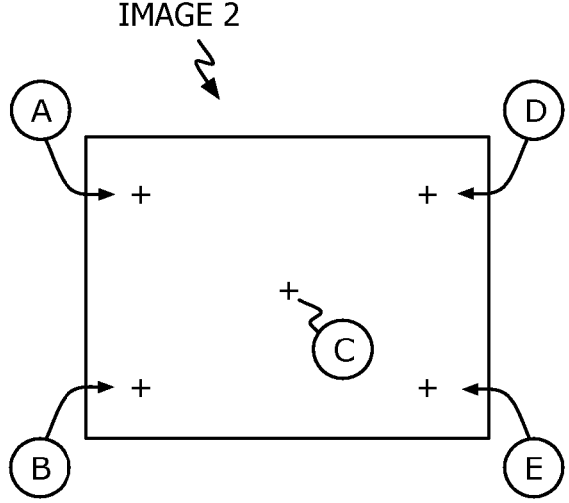
Figure 7:
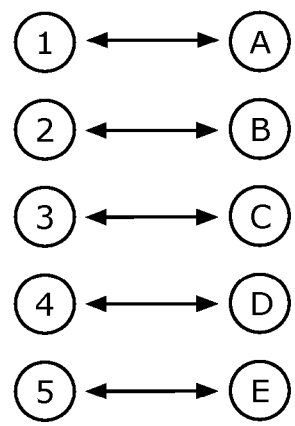
Figure 8:
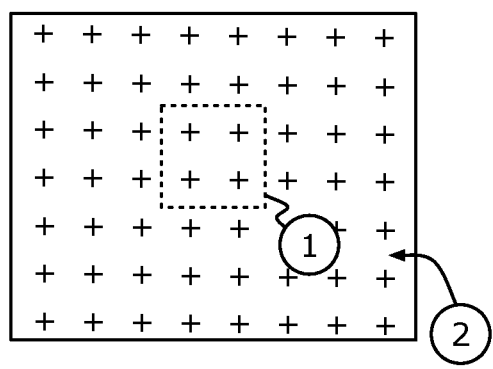
FIG. 8 illustrates the idea of using regions for the comparison of successive images in accordance with one embodiment.
Figure 8:
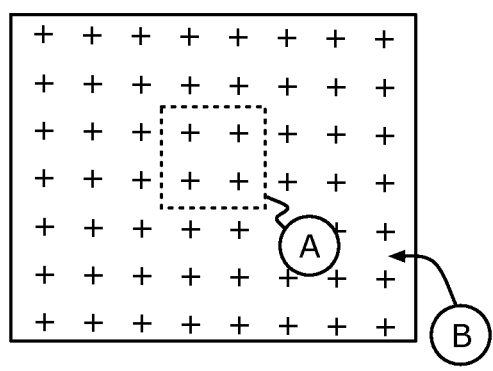
Figure 8:
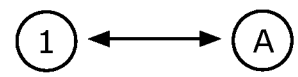
Figure 8:
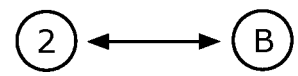

Various changes in the materials, components, circuit elements, as well as in the details of the illustrated operational methods are possible without departing from the scope of the following claims. For example, autofocus operations have been described in terms of the relative sharpness (contrast) between corresponding points in successive images. It will be recognized that the number of points in an image that can be so compared may vary from one (1) to many (e.g., 45). Referring to FIG. 7, one illustrative autofocus operation compares five (5) points between images captured at different times (image 1 at time $t_1$ and image 2 at time $t_2$). Autofocus operations may also determine an aggregate contrast value based on a collection of points (e.g., pixels), thereby forming regions that may be compared. This is illustrated in FIG. 8 in which a single contrast value may be determined for region 1 in image 1 (including those points or pixels in the center of the image) and compared with a single contrast value determined from those points in region A of image 2. Likewise, all those points in region 2 of image 1 (all those points not in region 1) may be combined (in any manner suitable to meet the designer's goals and/or requirements) and compared with a similar value determined for region B of image 2. The locations and regions illustrated in FIGS. 7 and 8 are illustrative only and are not meant to be limiting.

Another design option can be the use of mode input 140. This input may be user selectable or fixed according to the designer's goals. In an embodiment in accordance with this latter approach, the FAST mode may be automatically selected if orientation sensor 135 indicates the image capture device is more than a specified angle off horizontal. For example, if orientation sensor 135 indicates the device is angled up (from horizontal) by at least X°, or down by more than Y°, the FAST mode may be automatically invoked. The specific angles 'X' and 'Y' may be selected by the designer and may be the same (e.g., 40°) or different (e.g., X=50° and Y=40°).

In practice, it has been found beneficial to use multiple lens rather than a single lens as suggested above. Thus, lens 105 may be understood to represent a lens assembly that may have, for example, 2 to 7 individual lens elements. In addition, the number of points-of-interest and the use of a voice coil motor as an actuator are illustrative only. As is the direction of autofocus operations which were described as evaluating points-of-interest from infinity to the closest point at which the image capture device can focus. Finally, variations of the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. An autofocus method for a digital image capture device, the method comprising:
   receiving a signal from a sensor of a digital image capture device, wherein the digital image capture device has a full autofocus range of motion and the full autofocus range of motion has a corresponding full number of autofocus positions;
   determining an orientation of the digital image capture device based at least in part on the signal;
   determining a current autofocus range of motion based at east in part on the orientation, the current autofocus range of motion being less than the full autofocus range of motion; and
   performing an autofocus operation using the current autofocus range of motion and the full number of autofocus positions when the digital image capture device is in a first autofocus mode.

2. The method of claim 1, further comprising performing an autofocus operation using less than the full number of autofocus positions and the current autofocus range of motion when the digit image capture device is in a second autofocus mode.

3. The method of claim 2, further comprising selecting the second when the orientation is determined to be more than a specified angle away from horizontal.

4. The method of claim 1, wherein the act of performing an autofocus operation using the current autofocus range of motion and the full number of autofocus positions comprises uniformly distributing the full number of autofocus positions across the current autofocus range of motion.

5. A non-transitory computer readable medium, comprising:
- computer code to receive a signal from a sensor of a digital image capture device, the digital image capture device having a full autofocus range of motion, the full autofocus range of motion having a full number of autofocus positions;
- computer coda to determine an orientation of the digital image capture device base at least in part on the signal;
- computer code to determine a current autofocus range of motion based at least in part on the orientation, the current autofocus range of motion being less than the full autofocus range of motion; and
- computer code to perform an autofocus operation using the current autofocus range of motion and the full number of autofocus positions when in a first autofocus mode.

6. The non-transitory computer readable medium of claim 5, wherein the computer code to perform an autofocus operation further comprises computer program code to:
- perform an autofocus operation using less than the full number of autofocus positions and the current autofocus range of motion when in a second autofocus mode.

7. The non-transitory computer readable medium of claim 5, wherein the computer code to perform an autofocus operation using the current autofocus range of motion and the full number of autofocus positions when in a first autofocus mode comprises computer code to redistribute the full number of autofocus positions uniformly across the current autofocus range of motion.

8. The non-transitory computer readable medium of claim 5, wherein the computer code to determine an orientation of the digital image capture device comprises computer code to determine the digital image capture device is in a horizontal orientation.

9. The non-transitory computer readable medium of claim 5, wherein the computer code to determine the digital image capture device is in a horizontal orientation comprises computer code to determine the digital image capture device is within ±X° of a horizontal position, wherein "X" comprises is threshold value.

10. The non-transitory computer readable medium of claim 9, further comprising computer code to select the first autofocus mode when the digital image capture device is in a horizontal orientation.

11. An autofocus method for a digital image capture device comprising:
- receiving a signal from a sensor of a digital image capture device, wherein the digital image capture device has a full autofocus range of motion and the full autofocus range of motion has a corresponding full number of autofocus positions;
- determining an orientation of the digital image capture device based at least in part on the signal;
- determining a current autofocus range of motion based at least in part on the orientation, the current autofocus range of motion being less than the full autofocus range of motion;
- performing an autofocus operation using the current autofocus range of motion and the full number of autofocus positions when the digital image capture device is in a first autofocus mode; and
- performing an autofocus operation using less than the full number of autofocus positions and the current autofocus range of motion when the digital image capture device is in a second autofocus mode.

12. The method of claim 11, wherein the act of receiving a signal comprises receiving a signal from, an accelerometer sensor.

13. The method of claim 11, wherein the full autofocus range of motion represents the maximum range of motion a lens assembly of the digital image capture device can move during an autofocus operation.

14. The method of claim 11, wherein the act of determining an orientation of the digital image capture device comprises determining the digital image capture device is in a horizontal-facing orientation.

15. The method of claim 14, wherein the act of determining the digital image capture device is in a horizontal facing orientation comprises determining the digital image capture device is tilted at an angle within a specified range of being horizontal.

16. The method of claim 14, wherein the first mode is select when the digital image capture device is determined to be in the horizontal-facing orientation.

17. The method of claim 16, wherein the second mode is selected when the digital image capture device is determined to be in an orientation other than the horizontal-facing orientation.

18. The method of claim 11, wherein the act of performing an autofocus operation using the second mode is faster than the act of performing an autofocus operation using the full number of autofocus positions and the full autofocus range of motion.

19. The method of claim 11, wherein the act of performing an autofocus operation comprises:
- determining an autofocus parameter value for each of one or more locations in a first image of a scene;
- determining an autofocus parameter value for each location in a second image of the scene corresponding to the one or more locations in the first image;
- comparing the autofocus parameter values from the first image with the corresponding autofocus parameter values of the second image; and
- adjusting a position of a lens of the digital image capture device based on the act of comparing.

20. The method of claim 11, wherein the act of performing an autofocus operation using the current autofocus range of motion and the full number of autofocus positions comprises distributing the full number of autofocus positions across the current autofocus range of motion in a non-uniform manner.

21. A non-transitory program storage device, comprising:
- computer code to receive a signal from a sensor of a digital image capture device, the digital image capture device having a full autofocus range of motion, the full autofocus range of motion having a full number of autofocus positions;
- computer code to determine an orientation of the digital image capture device based at least in part on the signal;
- computer code to determine a current autofocus range of motion based at least in part on the orientation, the current autofocus range of motion being less than the full autofocus range of motion;
- computer code to perform an autofocus operation using less than the full number of autofocus positions and the current autofocus range of motion when the digital image capture device is in a first autofocus mode; and
- computer code to perform an autofocus operation using the full number of autofocus positions and the current autofocus range of motion when the digital image capture device is in a second autofocus mode.

22. The non-transitory program storage device of claim 21, wherein the computer code to determine an orientation of the digital image capture device comprises computer code to determine the digital image capture device is in a horizontal-facing orientation.

23. The non-transitory program storage device of claim 22, wherein the computer code to determine the digital image capture device is in a horizontal-facing orientation comprises computer code to determine the digital image capture device is tilted at an angle within a specified range of being horizontal.

24. The non-transitory program storage device of claim 21, wherein the computer code to perform an autofocus operation comprises:
   computer code to determine an autofocus parameter value for each of one or more locations in a first image of a scene;
   computer code to determine an autofocus parameter value for each location in a second image of the scene corresponding to the one or more locations in the first image;
   computer code to compare the autofocus parameter values from the first image with the corresponding autofocus parameter values of the second image; and computer code to adjust a position of a lens of the digital image capture device based on the act of comparing.

25. The non-transitory computer readable medium of claim 21, wherein the computer code to perform an autofocus operation using less than the full number of autofocus positions and the current autofocus range of motion comprises computer code to redistribute the full number of autofocus positions across the current autofocus range of motion uniformly.

26. An electronic device, comprising:
   a lens assembly;
   an actuator coupled to the lens assembly;
   a digital image sensor configured to receive light from the lens assembly;
   a memory operatively coupled to the digital image sensor;
   an orientation sensor;
   a programmable control unit operatively coupled to the actuator, memory and orientation sensor, wherein the memory includes computer code that, when executed by the programmable control unit, performs the method of claim 1.

27. The electronic device of claim 26, wherein the lens assembly comprises two or more individual lens elements.

28. The electronic device of claim 26, wherein the orientation sensor comprises an accelerometer.

* * * * *